United States Patent [19]

Patel

[11] 4,186,909

[45] Feb. 5, 1980

[54] FAIL-TO-NEUTRAL MODULE

[75] Inventor: Kishor Patel, Camilla, Wis.

[73] Assignee: Dynex/Rivett, Inc., Pewaukee, Wis.

[21] Appl. No.: 908,793

[22] Filed: May 23, 1978

[51] Int. Cl.[2] .................. F15B 13/042; F16K 31/383

[52] U.S. Cl. ...................................... 251/31; 137/544; 137/625.61

[58] Field of Search ...................... 137/625.61, 625.62, 137/625.64, 544, 549; 251/31

[56] References Cited

U.S. PATENT DOCUMENTS

| | | | |
|---|---|---|---|
| 3,101,650 | 8/1963 | Blanton | 137/625.62 X |
| 3,135,294 | 6/1964 | Huber | 137/625.61 |
| 3,964,518 | 6/1976 | Hesse et al. | 137/625.64 |
| 4,011,891 | 3/1977 | Knutson et al. | 137/625.64 X |
| 4,023,593 | 5/1977 | Piccardo | 137/625.64 |

OTHER PUBLICATIONS

Kinney et al., "What You Can Get in Electrohydraulic Servo Valves", *Applied Hydraulics and Pneumatics*, Feb. 1959, pp. 67 and 74.

*Primary Examiner*—Gerald A. Michalsky
*Attorney, Agent, or Firm*—John J. Byrne; Edward E. Dyson

[57] ABSTRACT

Disclosed is an improved hydraulic control comprising a fail-to-neutral module. As is conventional, the hydraulic control comprises a main spool and a fluid flow path comprising a bridge circuit including a driver stage. The fail-to-neutral module comprises means defining a fail-to-neutral orifice which (a) is located in the fluid flow path upstream of the bridge circuit and (b) has a relatively large flow area but a maximum dimension smaller than the smallest orifice in the pilot stage. Preferably the means comprise a pin positioned through a hole, the pin and the hole both being circular in cross-section and coaxial, and the fail-to-neutral orifice is the clearance between the pin and the boundary of the hole.

7 Claims, 8 Drawing Figures

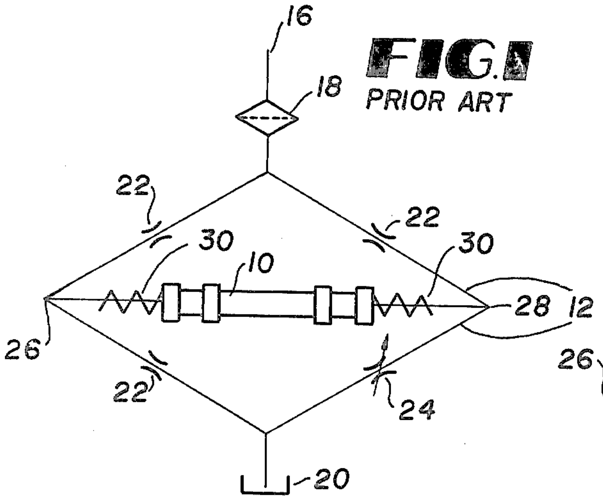
FIG. 1
PRIOR ART
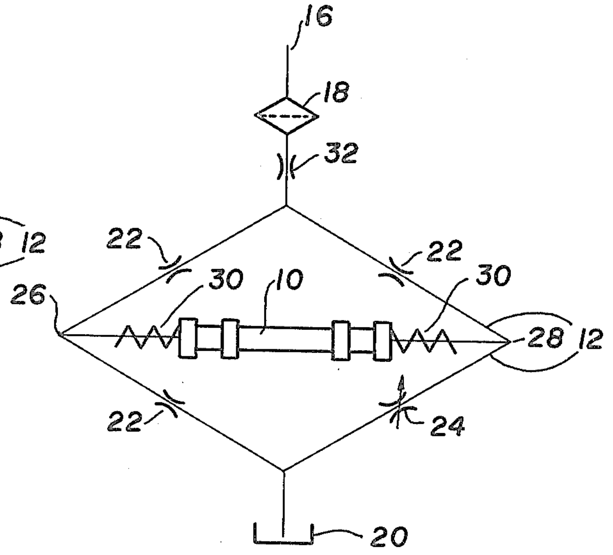
FIG. 2
FIG. 3
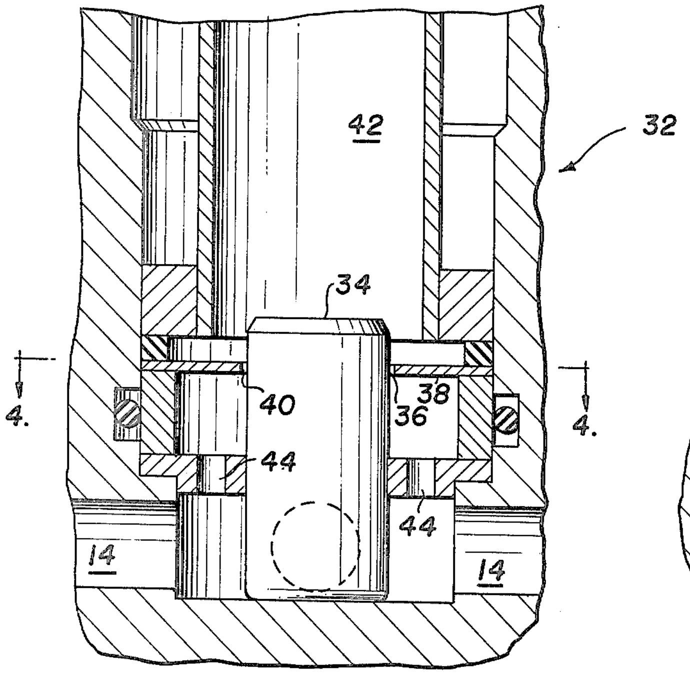
FIG. 4
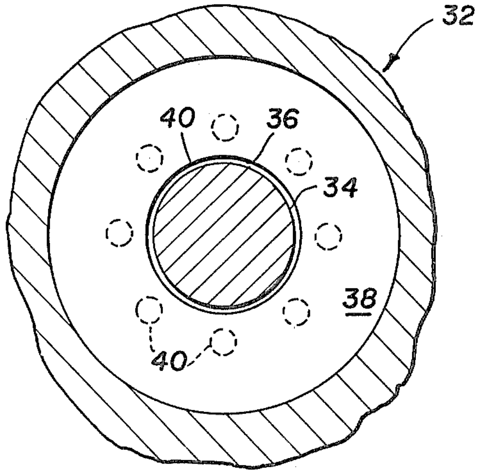

FIG.5
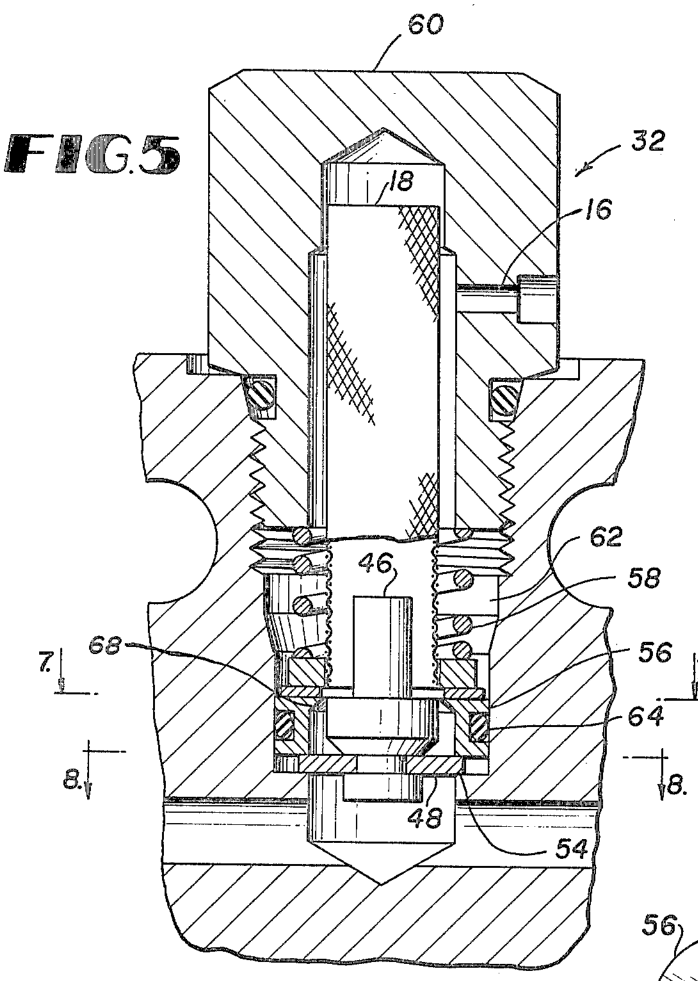
FIG.7
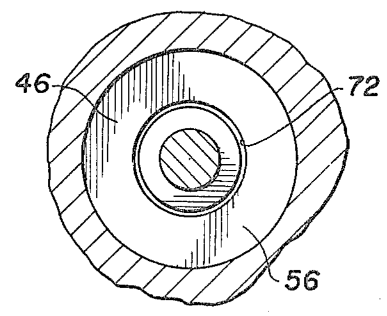
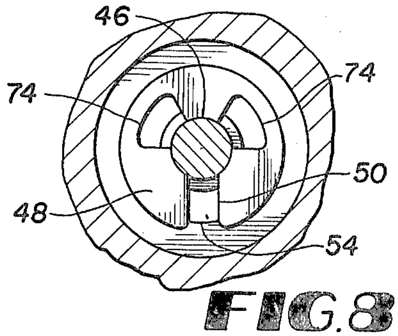
FIG.8
FIG.6
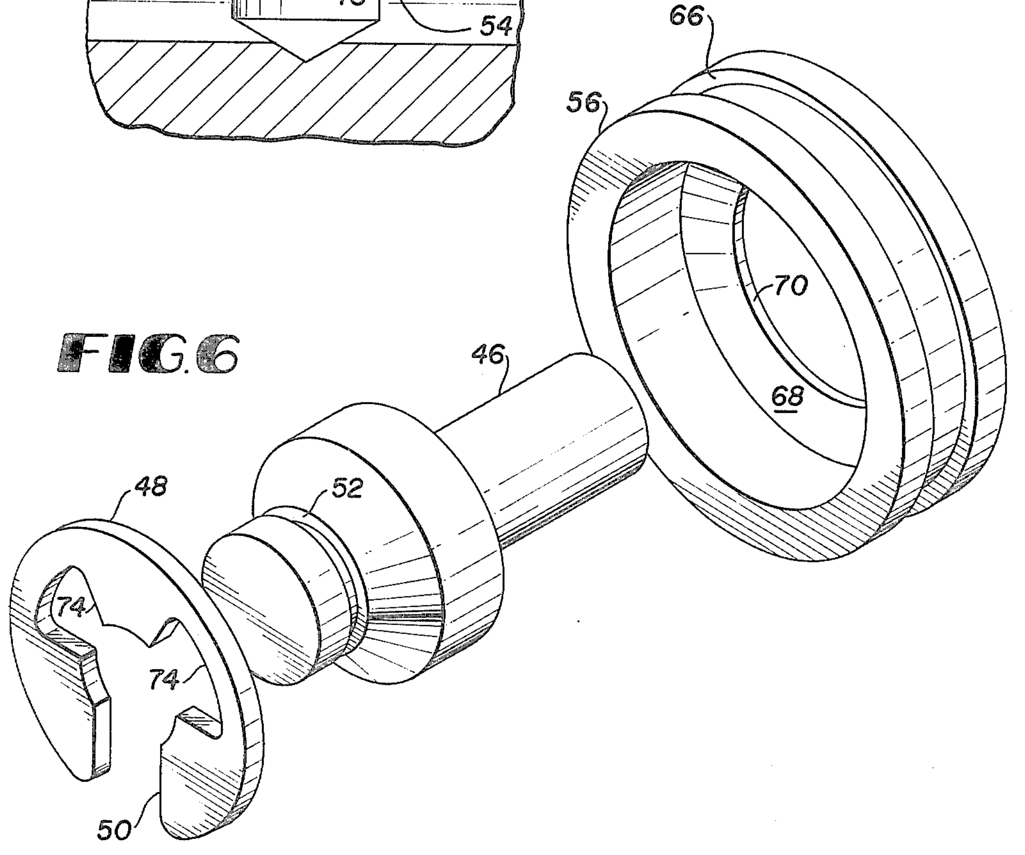

FAIL-TO-NEUTRAL MODULE

FIELD OF THE INVENTION

This invention relates to hydraulic controls comprising a spool and a fluid flow path comprising a bridge circuit including a driver stage.

BACKGROUND OF THE INVENTION

Hydraulic controls are conventionally provided with a pilot stage filter to protect against contamination clogging one of the orifices in the driver stage of the hydraulic control and thereby causing the spool to go hard-over. However, such filters are not completely reliable, resulting in occasional hard-over failure.

As will be obvious, a hard-over failure can result in significant property damage and/or personal injury in many applications. Thus, if the hydraulic fluid supplied to the driver stage of a hydraulic control becomes highly contaminated, the desired mode of failure due to contamination is for the spool to move to the center, or neutral, position, thereby shutting off all flow from the valve to the load ports. This action is termed "fail-to-neutral" movement herein.

OBJECTS OF THE INVENTION

It is, therefore, a general object of this invention to provide a fail-to-neutral module which ensures that, if the fluid supplied to the driver stage of the hydraulic control becomes highly contaminated, causing it to fail, the mode of failure will be that the main spool will move to the neutral position, thereby shutting off all flow from the valve to the load ports.

It is a further object of this invention to reduce the incidence of failure due to contamination of the fluid supplied to the driver stage of the hydraulic control.

It is yet a further object of this invention to accomplish the foregoing objects by the provision of a module which is simple and inexpensive to manufacture and sturdy and reliable in use.

Other objects and advantages of the present invention will become apparent from the following detailed description of two preferred embodiments thereof taken in conjunction with the accompanying drawings.

BRIEF DESCRIPTION OF THE DRAWINGS

FIG. 1 is a schematic drawing of a prior-art hydraulic control.

FIG. 2 is a schematic drawing of a hydraulic control incorporating the present invention.

FIG. 3 is a sectional view of a portion of a first embodiment of hydraulic control incorporating the present invention.

FIG. 4 is a view along the line 4—4 in FIG. 3.

FIG. 5 is a sectional view of a portion of a second embodiment of a hydraulic control incorporating the present invention.

FIG. 6 is an exploded perspective view of certain elements of the embodiment shown in FIG. 5.

FIG. 7 is a view along the line 7—7 in FIG. 5.

FIG. 8 is a view along the line 8—8 in FIG. 5.

DETAILED DESCRIPTION OF THE PRESENTLY PREFERRED EMBODIMENTS

FIG. 1 shows a typical prior-art hydraulic control in schematic form. It comprises a main spool 10 and a fluid flow path comprising a bridge circuit 12 including a driver stage. Pilot supply pressure is provided at 16, a pilot filter 18 is located in the fluid flow path upstream of the bridge circuit 12, and a tank 20 is located in the fluid flow path downstream of the bridge circuit 12. The bridge circuit 12 itself comprises three fixed orifices 22 and one variable orifice 24. At null, the pressure $Pc_1$ at bridge point 26 equals the pressure $Pc_2$ at bridge point 28, and centering springs 30 hold the main spool 10 in its neutral position. If contamination fully or partially clogs any of the orifices in the driver stage, $Pc_1$ or $Pc_2$ will vary, urging the main spool 10 from its neutral position.

FIG. 2 is a schematic drawing of a hydraulic control incorporating the present invention. It is generally similar to FIG. 1, and the same parts numbers are used for parts which are the same in both hydraulic controls. The difference between the FIG. 1 embodiment and the FIG. 2 embodiment is the provision in the FIG. 2 embodiment of a fail-to-neutral module 32. That module, which is preferably separable from the remainder of the hydraulic control to facilitate maintenance and replacement, comprises means defining a fail-to-neutral orifice which is located in the fluid flow path upstream of the bridge circuit 12 and which has a relatively large flow area but a maximum dimension smaller than (and preferably much smaller than) the smallest orifice in the driver stage.

FIGS. 3 and 4 are fragmentary views of a first preferred embodiment of the fail-to-neutral module 32. As shown therein, a pin 34 positioned through a hole 36 in a disc 38 defines a fail-to-neutral orifice 40, the orifice being the clearance between the pin 34 and the boundary of the hole 36. Fluid enters the module 32 at 42, passes through the orifice 40 and passageways 44, and exits the module 32 into the driver stage. Preferably, the pin 34 and the hole 36 are both circular in cross-section and coaxial, as shown, but obviously many other configurations are possible, and the orifice 40 need not even be annular in shape.

Because the maximum dimension in the orifice 40 is less than the smallest orifice dimension in the driver stage, particles of contamination will collect in the fail-to-neutral module rather than passing on to the driver stage downstream. As the fail-to-neutral module collects more and more particles of contamination, it begins to shut off the flow to the downstream orifices, but it affects both legs of the bridge circuit 12 equally, and $Pc_1$ always equals $Pc_2$ when the signal to the valve is zero. Thus the centering springs 30 always maintain the main spool 10 in the neutral position when the signal to the valve is zero.

Because the fail-to-neutral module 32 is in series with the pilot supply pressure, it is desirable to have as little pressure drop across the module as possible. For that reason, the fail-to-neutral orifice 40 should have a small maximum dimension to collect contaminants, but a relatively large effective flow area to reduce the pressure drop. For example, in the embodiment illustrated in FIGS. 3 and 4, the maximum clearance between the pin 34 and the boundary of the hole is held to a few thousandths of an inch, but the flow area is relatively large and can be increased by increasing the pin diameter and maintaining the same diametral clearance. A 0.250" diameter pin with an 0.003" diametral clearance per side has the same flow area as a 0.072" diameter orifice, while most downstream hydraulic control orifices range between 0.015" and 0.030" in diameter. Thus, the pressure drop across a fail-to-neutral module of this design can easily be held to a low value compared to the pressure drop across the pilot orifices.

A second embodiment of the fail-to-neutral module 32 is shown in FIGS. 5–8. In this embodiment, a pin 46 is held in position by a retaining ring 48, which has a radial slot 50 which allows the retaining ring 48 to be slipped into a groove 52 in the pin 46. The retaining ring 48 is in turn held in place by an internal shoulder 54 on the lower side and by contact with a plate 56 on the upper side. A compression spring 58 forced inwardly by a plug 60 bears indirectly against the plate 56, maintaining the axial position of the whole assembly. The radial position of the plate 56 is maintained by contact with the sides of the chamber 62, with which the plate 56 is in close sliding contact. An O-ring 64 in an external groove 66 in the plate 56 is provided to prevent passage of fluid around the periphery of the plate 56. The upper inner surface of the plate 56 is sloped radially inwardly at 68 to an axially short annular land 70, seen in FIG. 6. This inward sloping serves to radially locate the pin 46 during assembly. The radius of the annular land 70 exceeds the radius of the pin 46 at that point by a few thousandths of an inch, and the tubular space between the pin 46 and the annular land 70 is the fail-to-neutral orifice 72. Fluid enters the module 32 at 16, passes through the pilot filter 18, the fail-to-neutral orifice 72, and passageways 74 and slot 50 in the ring 48, after which it exits the module 32 into the driver stage.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto, and not by the foregoing embodiments.

What is claimed is:

1. A hydraulic control comprising:

(a) a main spool;

(b) a fluid flow path operatively connected to said main spool and comprising a bridge circuit containing a plurality of orifices at least one of which is a variable orifice; and (c) means defining a fail-to-neutral orifice which (i) has a flow area large enough so that it does not cause an appreciable pressure drop but a maximum dimension smaller than the smallest orifices in the bridge circuit, said maximum dimension being small enough so that the fail-to-neutral orifice serves as a filter for contaminants in fluid passing through said fluid flow path, and (ii) is located in said fluid flow path upstream of the bridge circuit, said means comprising a pin positioned through a hole, the fail-to-neutral orifice being the clearance between the pin and the boundary of the hole.

2. A hydraulic control as recited in claim 1 wherein the maximum dimension of the fail-to-neutral orifice is much smaller than the smallest orifice in the bridge circuit.

3. A hydraulic control as recited in claim 1 wherein the pin and the hole are both circular in cross-section and coaxial.

4. A hydraulic control as recited in claim 1 wherein said means further comprise a member surrounding said pin, said member being sloped radially inwardly to an axially short annular land surrounding said pin, the fail-to-neutral orifice being the clearance between said pin and said land, the sloping portion serving to radially position said pin.

5. A hydraulic control as recited in claim 4 wherein:

(a) said pin has a peripheral groove and (b) said means further comprise:

(i) a retaining ring which has a radial slot sized to allow said pin to be slipped into said retaining ring at the peripheral groove in said pin and and a central aperture sized to receive said pin and (ii) means for axially positioning said retaining ring.

6. A hydraulic control as recited in claim 5 wherein said pin and said annular land are both circular in cross-section and coaxial.

7. A hydraulic control as recited in claim 4 wherein said pin and said annular land are both circular in cross-section and coaxial.

* * * * *